United States Patent
Caenazzo et al.

(10) Patent No.: US 7,426,880 B2
(45) Date of Patent: Sep. 23, 2008

(54) GEARBOX FOR A DOUBLE CLUTCH TRANSMISSION OF A MOTOR VEHICLE

(75) Inventors: Dario Caenazzo, Orbassano (IT); Domenico Mesiti, Orbassano (IT); Filippo Baldascini, Orbassano (IT); Gian Luigi Pregnolato, Orbassano (IT); Carlo Emilio Baret, Orbassano (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 295 days.

(21) Appl. No.: 11/422,749

(22) Filed: Jun. 7, 2006

(65) Prior Publication Data

US 2006/0278028 A1 Dec. 14, 2006

(30) Foreign Application Priority Data

Jun. 9, 2005 (EP) .................................. 05425412

(51) Int. Cl.
*F16H 3/08* (2006.01)
(52) U.S. Cl. .......................................... 74/330; 74/331
(58) Field of Classification Search .................. 74/330, 74/331
See application file for complete search history.

(56) References Cited

U.S. PATENT DOCUMENTS

| | | | |
|---|---|---|---|
| 4,461,188 A | 7/1984 | Fisher | |
| 7,197,954 B2 * | 4/2007 | Baldascini et al. | 74/331 |
| 7,246,534 B2 * | 7/2007 | Kim et al. | 74/330 |
| 7,258,032 B2 * | 8/2007 | Kim | 74/330 |
| 7,258,033 B2 * | 8/2007 | Baldascini et al. | 74/331 |
| 2005/0000307 A1 | 1/2005 | Gumpoltsberger | |
| 2005/0081661 A1 | 4/2005 | Kim | |

FOREIGN PATENT DOCUMENTS

| | | |
|---|---|---|
| DE | 103 16 070 A1 | 4/2003 |
| EP | 1 124 079 A2 | 1/2001 |
| FR | 2 847 013 | 5/2004 |

\* cited by examiner

*Primary Examiner*—Tisha D Lewis
(74) *Attorney, Agent, or Firm*—Sughrue Mion, PLLC

(57) ABSTRACT

The gearbox comprises: a first, inner input shaft which carries a first and a second driving gear wheel associated with odd gears and with a reverse gear; a second, outer input shaft which is disposed coaxially with the first and carries a third and a fourth driving gear wheel associated with even gears; a first output shaft which carries a first driven gear wheel meshing with the first driving gear wheel to form a first gear, a second driven gear wheel meshing with the second driving gear wheel to form a fifth gear and a third driven gear wheel meshing with the fourth driving gear wheel to form a sixth gear; and a second output shaft which carries a fourth driven gear wheel meshing with the first driven gear wheel to form the reverse gear, a fifth driven gear wheel meshing with the second driving gear wheel to form a third gear, a sixth driven gear wheel meshing with the third driving gear wheel to form a second gear and a seventh driven gear wheel meshing with the fourth driving gear wheel to form a fourth gear.

11 Claims, 4 Drawing Sheets

GEARBOX FOR A DOUBLE CLUTCH TRANSMISSION OF A MOTOR VEHICLE

BACKGROUND OF THE INVENTION

The present invention relates to a five or more speed gearbox for a double clutch transmission of a motor vehicle.

SUMMARY OF THE INVENTION

The object of the invention is to provide a five or more speed gearbox for a double clutch transmission of a motor vehicle, which can be adapted with the smallest possible number of modifications to form a manually controlled single clutch transmission and which has a simple structure and small size, especially in the axial direction.

These and other objects are fully achieved according to the invention by a gearbox having the characteristics defined in the annexed claim 1. Further advantageous characteristics of the invention are defined in the dependant claims.

As will become clear from the following description, a gearbox according to the invention makes it possible to maximise the number of common components between the version intended for a double clutch transmission and the corresponding version intended for a single clutch transmission and to minimise the number of modifications required to convert from one version to the other.

In effect, the single clutch version is obtainable from the double clutch version simply by remaking the driven gear wheel of second gear and moving it onto the other output shaft. It is necessary further to move the gear wheels of third and fifth gear since the single clutch version requires a different gear assembly sequence from that of the double clutch version, but this does not involve additional burdens. The secondary shafts, the clutch units and the gear wheels of first, third, fourth, fifth and reverse gear (as well as the gear wheels of sixth and seventh gear where present) are identical for the double clutch version and for the single clutch version.

Preferably the two secondary shafts are identical to one another, which reduces the number of different components necessary for assembly of the gearbox and therefore the costs of production.

Advantageously, in the version of the gearbox intended for a double clutch transmission, it is possible to make all the gear changes (even multiple changes) in power shift mode, with the exception of the change from sixth to seventh gear in the case of seven speed gearboxes.

A further advantage is represented by the sharing of the gears, in particular between first gear and reverse and between third gear and fifth gear, which makes is possible to eliminate the reverse gear shaft and to limit the axial size of the gearbox. A further reduction in the axial size can be obtained, according to a variant embodiment relating to a six speed gearbox, by virtue of the sharing of fourth and sixth gear.

BRIEF DESCRIPTION OF THE DRAWINGS

Further characteristics and advantages of the invention will become clear from the following detailed description, given purely by way of non limitative example, with reference to the attached drawings, in which.

BRIEF DESCRIPTION OF THE DRAWINGS

The following description relates to a six speed transmission, but it is obvious that the invention is equally applicable to a five or seven speed transmission as will be better clarified hereinafter.

The gear wheels corresponding to the different forward gears of the transmission are indicated in the figures with the roman numerals I, II, III, IV, V and VI, respectively for the first, second, third, fourth, fifth and sixth gear, whilst the gear wheel for the reverse gear is indicated with the letter R.

Figure 1:
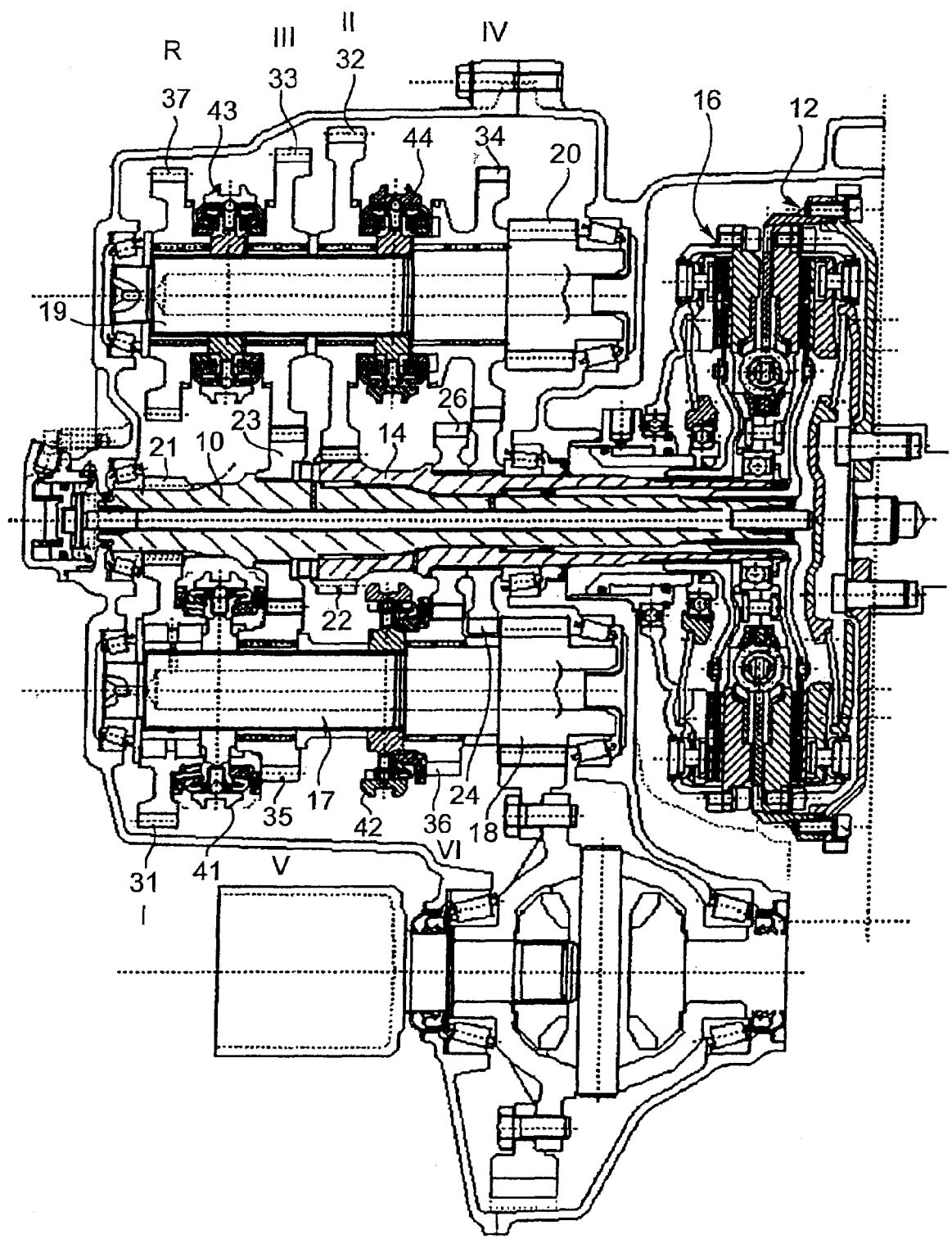
FIG. 1 is an axial sectional view of a six speed double clutch transmission for a motor vehicle having a gearbox according to a first embodiment of the present invention.

Referring first to FIG. 1, a six speed double clutch transmission for a motor vehicle having a gearbox according to a first embodiment of the invention comprises;

a first input shaft 10 associated with the odd gears and the reverse gear;

a first friction clutch generally indicated 12, operable to couple the first input shaft 10 with an engine shaft (not illustrated);

a second input shaft 14 associated with the even gears, which is disposed coaxially with the first shaft 10 and is formed as a hollow shaft within which that portion of the first shaft 10 nearer the engine shaft is inserted;

a second friction clutch generally indicated 16, operable to couple the second input shaft 14 with the engine shaft;

a first output shaft 17, disposed parallel to the two input shafts 10 and 14, and carrying a first final reduction pinion 18; and a second output shaft 19 disposed parallel to the two input shafts 10 and 14 and carrying a second final reduction pinion 20.

The first input shaft 10 carries, in order from left to right with reference to the point of view of an observer of FIG. 1, a driving gear wheel 21 associated with the first gear and the reverse gear and a driving gear wheel 23 associated with the third and fifth gears. In the embodiment illustrated, the two driving gear wheels 21 and 23 are both fixed for rotation with the first input shaft 10. Moreover, the gear wheel 21 is formed integrally with the shaft 10.

The second input shaft 14 carries, in order from left to right, a driving gear wheel 22 associated with the second gear, a driving gear wheel 26 associated with the sixth gear and a driving gear wheel 24 associated with the fourth gear. In the embodiment illustrated, all the driving gear wheels 22, 24 and 26 are fixed for rotation with the second input shaft 14. Moreover, the gear wheel 22 is integrally formed with the shaft 14.

The first output shaft 17 carries, in order from left to right, a driven gear wheel 31 permanently meshing with the driving gear wheel 21 carried by the first input shaft 10 to form first gear, a driven gear wheel 35 permanently meshing with the driving gear wheel 23 carried by the first input shaft 10 to form the fifth gear, and a driven gear wheel 36 permanently meshing with the driving gear wheel 26 carried by the second input shaft 14 to form the sixth gear.

The driven gear wheels 31, 35 and 36 are all freely rotatably mounted on the first output shaft 17. Between the two freely rotatable gear wheels 31 and 35 on the shaft 17 is mounted a slidable engagement sleeve 41 which is selectively displaceable towards the left or right to couple the wheel 31 or the wheel 35 respectively to the shaft 17 and thus to engage the first or the fifth gear respectively. Alongside the freely rotatable driven wheel 36 on the shaft 17 there is mounted a slidable engagement sleeve 42 which is displaceable towards the right to couple the wheel 36 to the shaft 17 and thus engage the sixth gear.

The second output shaft 19 carries, in order from left to right, a driven gear wheel 37 permanently meshing with the driven gear wheel 31 carried by the first output shaft 17 to form the reverse gear, a driven gear wheel 33 permanently meshing with the driving gear wheel 23 carried by the first input shaft 10 to form the third gear, a driven gear wheel 32 permanently meshing with the driving gear wheel 22 carried by the second input shaft 14 to form the second gear and a driven gear wheel 34 permanently meshing with the driving gear wheel 24 carried by the second input shaft 14 to form the fourth gear.

The driven gear wheels 37, 33, 32, and 34 are all freely rotatably mounted on the second output shaft 19. Between the two freely rotatable driven wheels 37 and 33 on the shaft 19 is mounted a slidable engagement sleeve 43 which is selectively displaceable towards the left or right to couple the wheel 37 or the wheel 33 respectively to the shaft 19 and thus engage the reverse gear or the third gear respectively. Finally, between the two freely rotatable driven gear wheels 32 and 34 on the second output shaft 19 is mounted a slidable engagement sleeve 44 which is selectively displaceable towards the left or right to couple the wheel 32 or the wheel 34 respectively to the shaft 19 and thus engage the second or the fourth gear respectively.

In this embodiment, therefore, the gear wheels of first gear and reverse gear have in common the driving gear wheel 21, and likewise the gear wheels of third and fifth gear have in common the driving gear wheel 23.

Advantageously, the two output shafts 17 and 19, including the respective final reduction pinions 18 and 20, are identical to one another, which makes it possible to reduce the number of different components necessary for assembly of the gearbox and therefore the overall costs of this latter.

Moreover, with the transmission described above all the sequential gear changes can be effected in 'power shift' mode.

Figure 2:
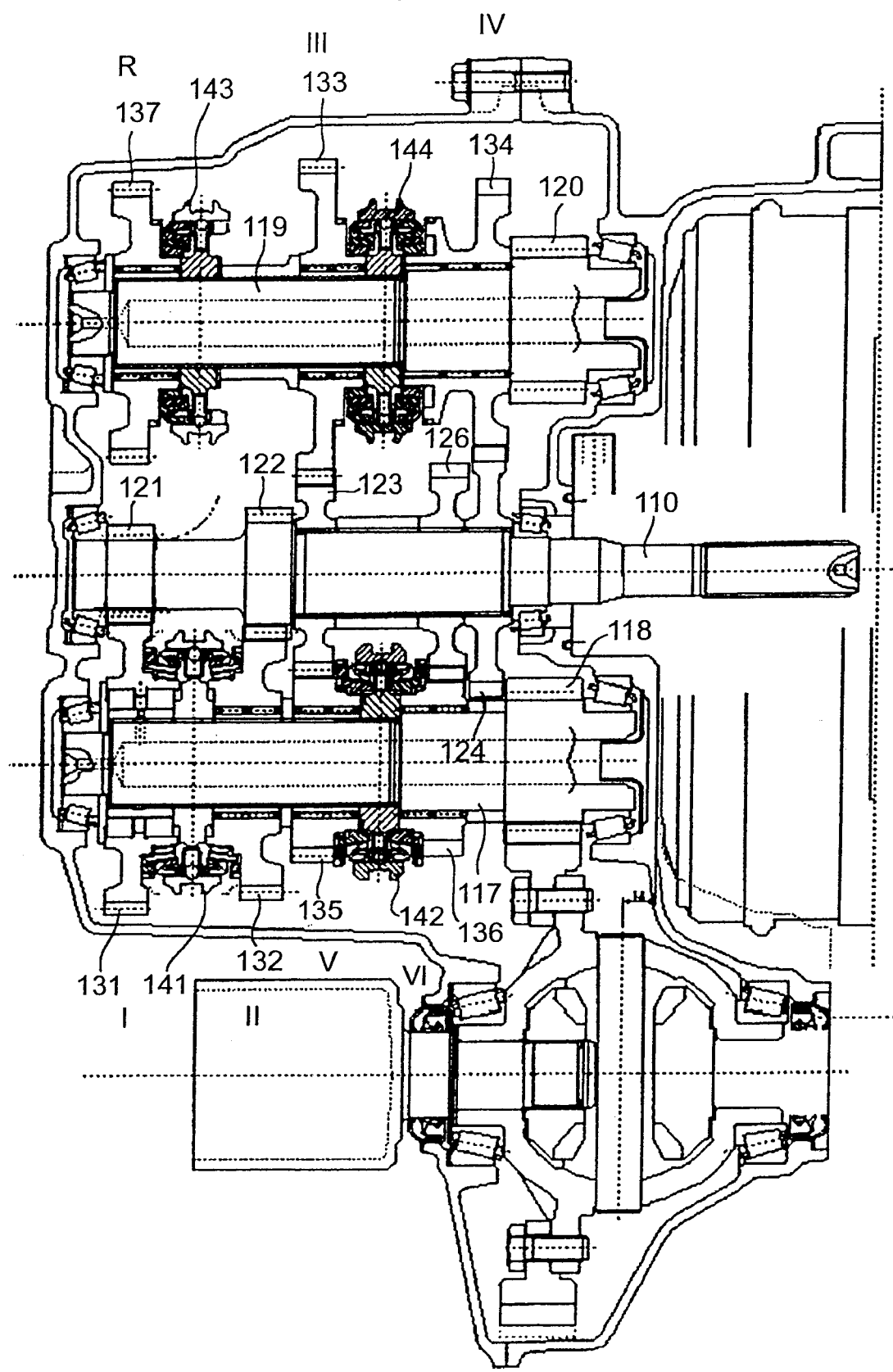
FIG. 2 is an axial sectional view of a six speed single clutch transmission obtainable from the transmission of FIG. 1.

A six speed single clutch transmission, corresponding to the transmission of FIG. 1, is shown in FIG. 2, where parts and elements identical or corresponding to those of FIG. 1 have been given the same reference numerals increased by 100.

As is clear from a comparison between the two FIGS. 1 and 2, the single clutch transmission of FIG. 2 is obtainable from the double clutch transmission of FIG. 1 simply by replacing the two input shafts 10 and 14 with a single input shaft 110, moving the driven gear wheels of third and fifth gear, now indicated 133 and 135 respectively, onto the respective output shafts, now indicated 117 and 119 respectively, and remaking the driven gear wheel of second gear, now indicated 132, freely rotatably mounted on the first output shaft 117.

In the single clutch version the gear wheels of first gear and reverse gear also share the driving gear wheel indicated 121, and likewise the gear wheels of third and fifth gear share the driving gear wheel indicated 123.

In this case the first and second gear are selectively engageable by means of an engagement sleeve 141 mounted on the first output shaft 117, the fifth and sixth gear are selectively engageable by means of an engagement sleeve 142 mounted on the first output shaft 117, reverse gear is engageable by means of a an engagement sleeve 143 mounted on the second output shaft 119 and the third and fourth gear are selectively engageable by means of an engagement sleeve 144 mounted on the second output shaft 119.

Advantageously, the output shafts 117 and 119 of the single clutch version are identical to the output shafts 17 and 19 of the double clutch version.

Figure 3:
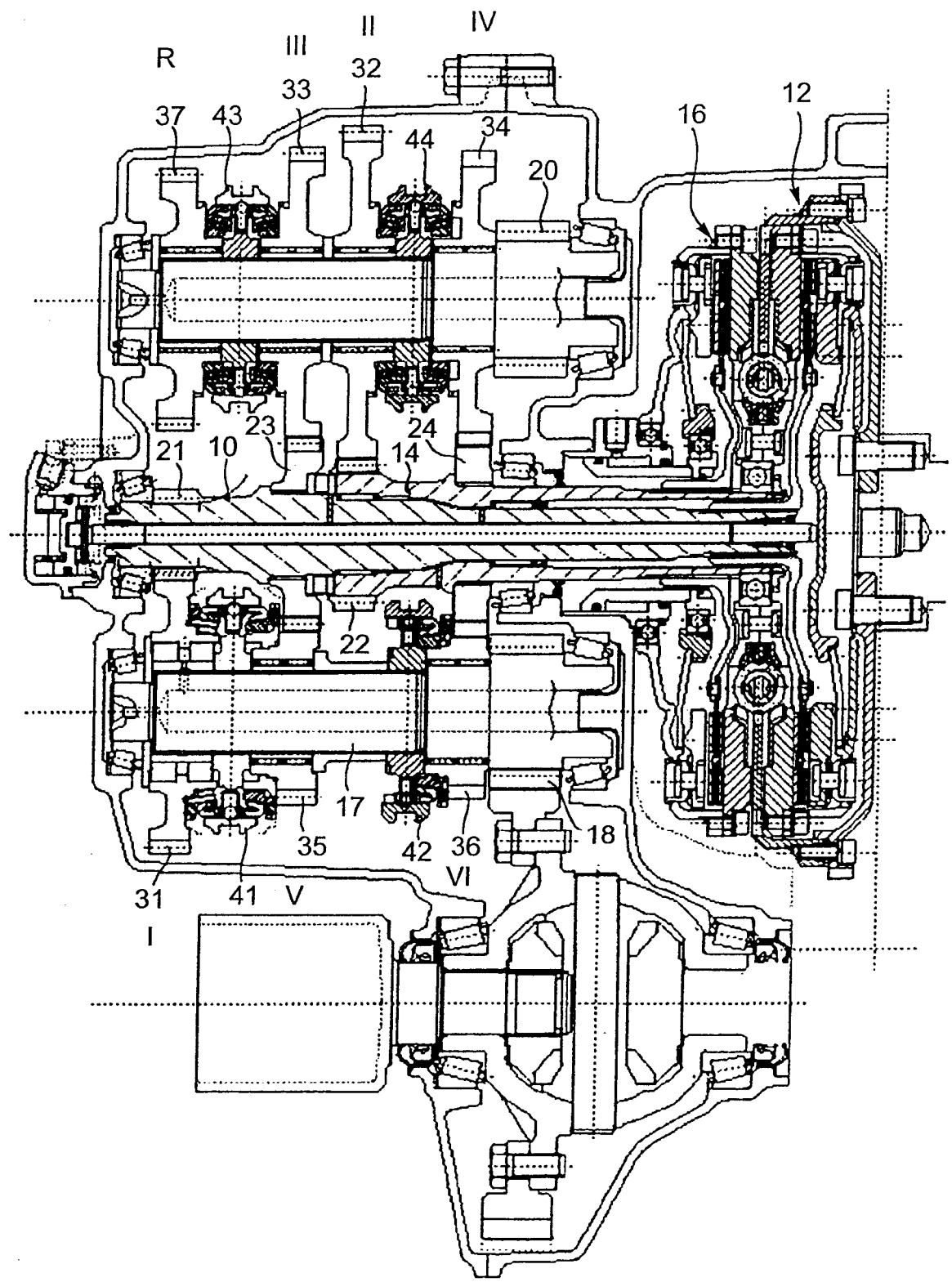
FIG. 3 is an axial sectional view of a six speed double clutch transmission for a motor vehicle having a gearbox according to a further embodiment of the present invention.

A six speed double clutch transmission for a motor vehicle, with a gearbox according to a second embodiment of the invention is illustrated in FIG. 3, where parts and elements identical or corresponding to those of FIG. 1 have been given the same reference numerals.

This second embodiment differs from the first substantially only in that the gear wheels of fourth and sixth gear also share the driving gear wheel, thus advantageously reducing the axial dimension of the transmission. In this case, in fact, the two driving gear wheels 24 and 26 of FIG. 1 are replaced by a single driving gear wheel 24 with which both the driven gear wheel 34 of fourth gear and the driven gear wheel 36 of sixth gear mesh permanently.

Figure 4:
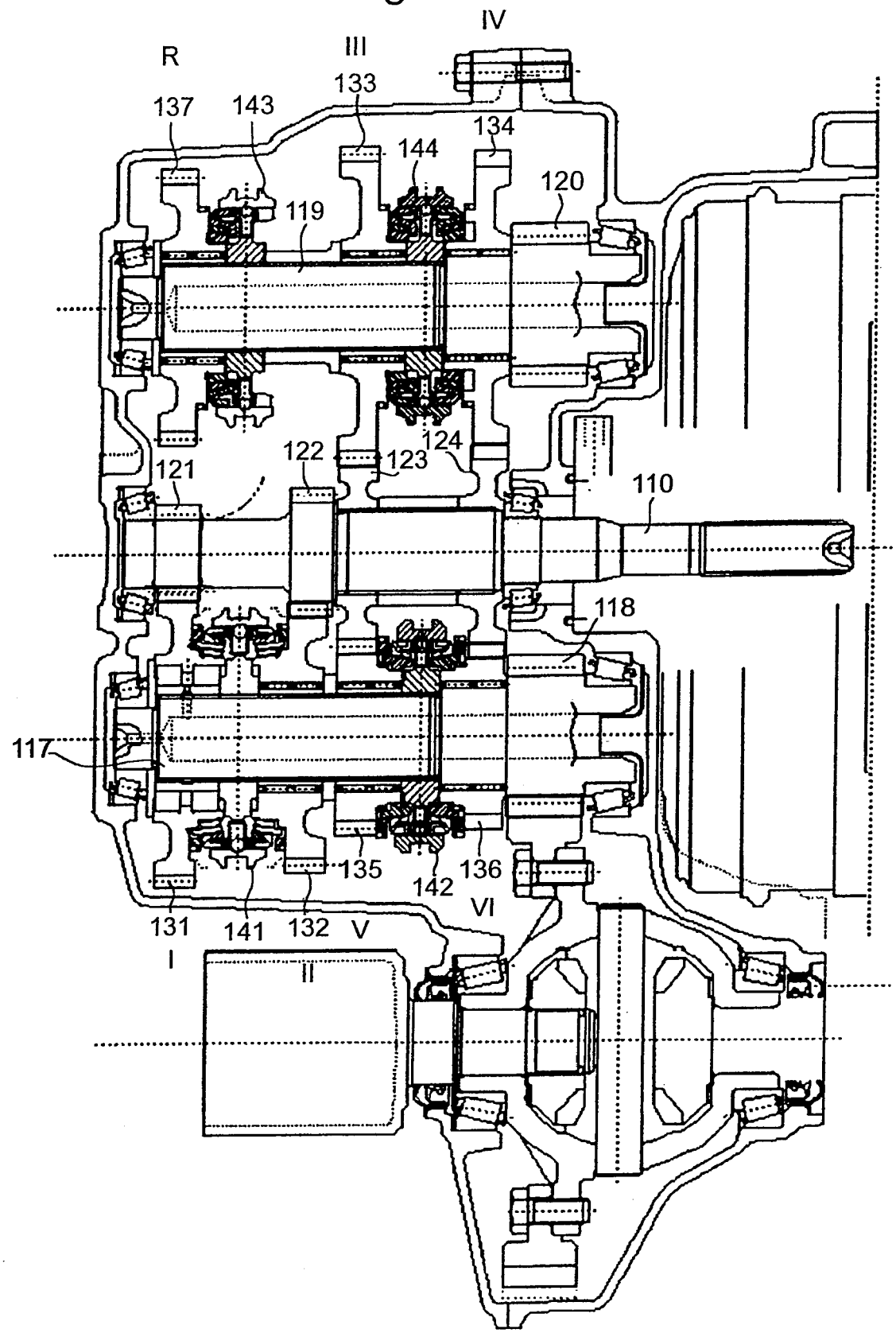
FIG. 4 is an axial sectional view of a six speed single clutch transmission obtainable from the transmission of FIG. 3.

The single clutch version corresponding to the transmission of FIG. 3 is illustrated in FIG. 4, where parts and elements identical or correspond to those of FIG. 3 have been given the same reference numerals increased by 100.

As far as the conversion from the double clutch version to the single clutch version (and vice versa) is concerned, the same considerations as explained above with reference to the transmissions of FIGS. 1 and 2 are valid.

As will easily be understood in the light of the preceding description, the main advantage of a gearbox according to the invention is that the conversion from the single clutch to the double clutch version and vice versa requires the modification of only the gear wheels of second gear beyond, naturally, the input shafts. All the other gear wheels on the other hand remain unchanged when converting between the two versions. This allows a significant reduction in the number of different parts necessary for assembly of the gearbox and therefore a significant reduction in production costs of the gearbox.

Naturally, the principle of the invention remaining the same, the embodiments and details of construction can be widely varied with respect to what has been described and illustrated purely by way of non-limitative example.

In particular, as already indicated above, although the invention has been described with reference to its application to a six speed transmission, it is clear that it can be equally applied to a five or seven speed transmission. To convert from the six speed version to the five speed version it is in fact sufficient to eliminate the driven gear wheel of sixth gear and the associated engagement sleeve. On the other hand, to convert from the six speed version to the seven speed version it is sufficient to add a driving gear wheel of seventh gear onto the first input shaft and an associated driven gear wheel onto the first output shaft disposed alongside the driven gear wheel of sixth gear and engageable by means of the same engagement sleeve. However, this naturally involves an increase in the length of the first input shaft and of the two output shafts.

What is claimed is:

1. A five or more speed gearbox for a double clutch transmission of a motor vehicle, comprising:
   a first, inner input shaft;
   a second, outer input shaft disposed coaxially with the first input shaft;
   first and second output shafts disposed parallel to the first and second input shafts;
   a first set of driving gear wheels associated with odd gears and with a reverse gear and carried by the first input shaft in such a way as to rotate fixedly with it;
   a second set of driving gear wheels associated with even gears and carried by the second input shaft in such a way as to rotate fixedly with it;

a first set of driven gear wheels mounted freely rotatably on the first output shaft and arranged to be driven to rotate each by a corresponding driving gear wheel to form a given gear;

a second set of driven gear wheels mounted freely rotatably on the second output shaft and arranged to be driven to rotate each by a corresponding driving gear wheel to form a given gear;

wherein the said first set of driving gear wheels includes a first driving gear wheel associated both with a first gear and the reverse gear and a second driving gear wheel associated both with a third gear and with a fifth gear;

wherein the said second set of driving gear wheels includes a third driving gear wheel associated with a second gear and a fourth driving gear wheel associated with a fourth gear;

wherein the said first set of driven gear wheels includes a first driven gear wheel meshing with the first driving gear wheel to form the first gear and a second driven gear wheel meshing with the second driving gear wheel to form the fifth gear; and wherein the said second set of driven gear wheels includes a third driven gear wheel arranged to be driven to rotate by the first driving gear wheel to form the reverse gear, a fourth driven gear wheel meshing with the second driving gear wheel to form the third gear, a fifth driven gear wheel meshing with the third driving gear wheel to form the second gear and a sixth driven gear wheel meshing with the fourth driving gear wheel to form the fourth gear.

2. A gearbox according to claim 1, wherein the third driven gear wheel meshes with the first driven gear wheel in such a way that the transmission of drive torque with the reverse gear engaged takes place from the first driving gear wheel to the first driven gear wheel and from this one to the third driven gear wheel.

3. A gearbox according to claim 1, wherein the said second set of driving gear wheels further includes a fifth driving gear wheel associated with a sixth gear and wherein the said first set of driven gear wheels further includes a seventh driven gear wheel meshing with the fifth driving gear wheel to form the sixth gear.

4. A gearbox according to claim 1, wherein the said first set of driven gear wheels further includes a seventh driven gear wheel meshing with the fourth driving gear wheel to form a sixth gear.

5. A gearbox according to claim 1, wherein the said first set of driving gear wheels further includes a sixth driving gear wheel associated with a seventh gear and in which the said first set of driven gear wheels further includes an eighth driven gear wheel meshing with the sixth driving gear wheel to form the seventh gear.

6. A gearbox according to claim 1, further including:

a first engagement sleeve arranged to connect the first or the second driven gear wheel selectively for rotation with the first output shaft to engage the first gear or the fifth gear, respectively;

a second engagement sleeve arranged to connect the third or the fourth driven gear wheel selectively for rotation with the second output shaft to engage the reverse gear or the third gear, respectively; and a third engagement sleeve arranged to connect the fifth or the sixth driven gear wheel selectively for rotation with the second output shaft to engage the second gear or the fourth gear, respectively.

7. A gearbox according to claim 6, wherein the said second set of driving gear wheels further includes a fifth driving gear wheel associated with a sixth gear and wherein the said first set of driven gear wheels further includes a seventh driven gear wheel meshing with the fifth driving gear wheel to form the sixth gear, the gearbox further including a fourth engagement sleeve arranged to connect the seventh driven gear wheel for rotation with the first output shaft to engage the sixth gear.

8. A gearbox according to claim 6, wherein the said first set of driven gear wheels further includes a seventh driven gear wheel meshing with the fourth driving gear wheel to form a sixth gear, the gearbox further including a fourth engagement sleeve arranged to connect the seventh driven gear wheel for rotation with the first output shaft to engage the sixth gear.

9. A gearbox according to claim 7, wherein the said first set of driving gear wheels further includes a sixth driving gear wheel associated with a seventh gear and in which the said first set of driven gear wheels further includes an eighth driven gear wheel meshing with the sixth driving gear wheel to form the seventh gear, and in which the fourth engagement sleeve is arranged to connect the seventh or eighth driven gear wheel selectively for rotation with the first output shaft to engage the sixth gear or the seventh gear, respectively.

10. A gearbox according to claim 8, wherein the said first set of driving gear wheels further includes a sixth driving gear wheel associated with a seventh gear and in which the said first set of driven gear wheels further includes an eighth driven gear wheel meshing with the sixth driving gear wheel to form the seventh gear, and in which the fourth engagement sleeve is arranged to connect the seventh or eighth driven gear wheel selectively for rotation with the first output shaft to engage the sixth gear or the seventh gear, respectively.

11. A gearbox according to claim 1, wherein in which the first and second output shafts are identical to one another.

* * * * *